United States Patent
Schmidt et al.

(10) Patent No.: US 6,684,726 B2
(45) Date of Patent: Feb. 3, 2004

(54) SUPPORT DEVICE FOR ARTICULATED VEHICLE TRAILER

(75) Inventors: Dirk Schmidt, Konigstein (DE); Jose Manuel Alguera Gallego, Aschaffenburg (DE)

(73) Assignee: Jost-Werke GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 10/204,983

(22) PCT Filed: Apr. 9, 2001

(86) PCT No.: PCT/EP01/04037
§ 371 (c)(1),
(2), (4) Date: Aug. 26, 2002

(87) PCT Pub. No.: WO01/76923
PCT Pub. Date: Oct. 18, 2001

(65) Prior Publication Data
US 2003/0011182 A1 Jan. 16, 2003

(30) Foreign Application Priority Data
Apr. 10, 2000 (DE) .......................................... 100 17 322

(51) Int. Cl.[7] .................................................. B06S 9/08
(52) U.S. Cl. ....................... 74/342; 280/766.1; 254/419
(58) Field of Search ....................... 74/342, 343, 411.5; 280/475, 766.1; 254/419, 425

(56) References Cited

U.S. PATENT DOCUMENTS

| 3,010,699 | A | * | 11/1961 | McKay ....................... 254/419 |
| 4,187,733 | A | * | 2/1980 | Walther et al. ............... 74/342 |
| 5,238,266 | A | | 8/1993 | VanDenberg |
| 5,676,018 | A | * | 10/1997 | VanDenberg ................ 74/373 |
| 6,099,016 | A | * | 8/2000 | Peveler ....................... 280/475 |

FOREIGN PATENT DOCUMENTS

| DE | 3401041 C1 | * | 6/1985 | ............. B60S/9/06 |
| DE | 198 36 635 A1 | | 2/2000 | |
| EP | 0 398 705 | | 11/1990 | |

* cited by examiner

Primary Examiner—Richard M. Lorence
(74) Attorney, Agent, or Firm—Hudak, Shunk & Farine, Co. LPA

(57) ABSTRACT

Landing gears of support devices for articulated vehicle trailers are frequently left in neutral position while the articulated vehicle is being driven. The vibrations which occur during driving can cause the landing gear to descend unintentionally, touch the ground and be damaged. The invention provides a support device with a landing gear which is reliably prevented from descending. To this end, the toothed ring of the input shaft (1) has two longitudinal sections (1a, 1b) of different diameters while having constant tooth spacing throughout. The tooth length in both sections (1a, 1b) is dimensioned in such a way that in neutral position, the input shaft (1) can rotate while the toothed wheel (3a) remains stationary but is prevented from rotating while the input shaft (1) remains stationary.

2 Claims, 4 Drawing Sheets

VIEW
A—A

SUPPORT DEVICE FOR ARTICULATED VEHICLE TRAILER

FIELD OF THE INVENTION

The invention relates to a device for supporting a trailer of a semitrailer truck comprising a vertical spindle drive for adjusting the height of the support device, a horizontal, particularly a crank-handle-driven input shaft, and an angle drive for redirecting the torque of the input shaft to the spindle drive. The angle drive comprises at least two gears that are spaced at a distance from one another for gear positions of different gear ratios, which can be optionally engaged with a ring gear of the input shaft by horizontally displacing the input shaft.

BACKGROUND OF THE INVENTION

The support devices usually have several gears with different gear ratios, which are optionally selected by shifting. These are typically two-speed gears in which one gear, the so-called low gear, is used for lifting loads and the second gear, the so-called overdrive gear, for quick telescoping of the lifting jack without load or with a small load.

Such a support device is described in German Laid-Open Publication DE 19 836 635 A1, which must be considered definitive. The prior art support device, in addition to the two gear positions, also has a neutral position. In this position, torque transmission between input shaft and output shaft is interrupted.

Consequently, neither driving nor braking torques can be transmitted. Thus, if the driven shaft is stationary the drive shaft can rotate, and vice versa. In a support device, the neutral position is used to make it easier to find the gear positions by rotating the crank. However, if the support device is left in neutral position during travel, i.e. with the inner legs cranked up, the absence of a braking torque has a negative effect. Due to vibrations occurring during travel, the inner legs can descend and touch the ground. This can cause serious damage and even result in the loss of parts on the road. Although the manufacturers point out that the device must be put in gear during travel, these instructions are often not observed in daily practice.

U.S. Pat. No. 5,238,266 discloses a support device with a gear without a neutral position. This ensures that the device is always in gear and the gears thus prevent an interior leg from descending. A substantial drawback of this support device is that during shifting between gears there is a position in which both gears are engaged simultaneously. This not only affects the ease of shifting but may also cause damage to the components that are engaged.

SUMMARY OF THE INVENTION

The object of the invention is to provide a support device whose gears are equipped with a neutral position with its advantages. Any unintended descending of an inner leg of the support device is to be prevented.

According to the invention, this object is attained by a support device in which the ring gear of the input shaft has two longitudinal sections of different diameters but with uniform tooth pitch throughout. In other words, one section has a normal diameter with full tooth formation, the axial length of which is less than the distance between two gears, to define a neutral position for the input shaft, and an extension section with radially reduced tooth length, which when the input shaft is in neutral position protrudes into a gear. This reduced length of the teeth of the extension section is dimensioned in such a way that in neutral position when the gear is stationary the input shaft is rotatable, but when the input shaft is stationary the gear is prevented from rotating because the teeth with reduced length engage.

This design makes it possible to shift between the two gear positions through a neutral position. This prevents the crank drive, which is displaceable in axial direction, from simultaneously engaging with its gear in both gear positions.

In neutral position, the gear with reduced tooth length in the extension section rotates past the stationary external gear teeth of the drive shaft for the low gear position when the crank drive rotates.

During travel, however, the inner leg may move downwardly inside the exterior space due to its own weight as a result of shocks and vibrations. This is prevented according to the invention by blocking the external gear teeth of the drive shaft for the low gear, which rotate as the inner leg moves downwardly, through the reduced tooth length of the extension sections.

In a preferred embodiment, the angle drive has exactly two gears that are spaced at a distance from one another for gear positions of different gear ratios. The gear with the smaller diameter forms an overdrive position together with a gear driven by the crank drive, while the non-displaceable gear with the larger diameter can be brought into direct engagement with the gear of the crank drive by axially displacing the crank drive.

BRIEF DESCRIPTION OF THE DRAWING

The invention will now be described by way of example with reference to the figures in which.

DETAILED DESCRIPTION OF THE INVENTION

Figure 1:
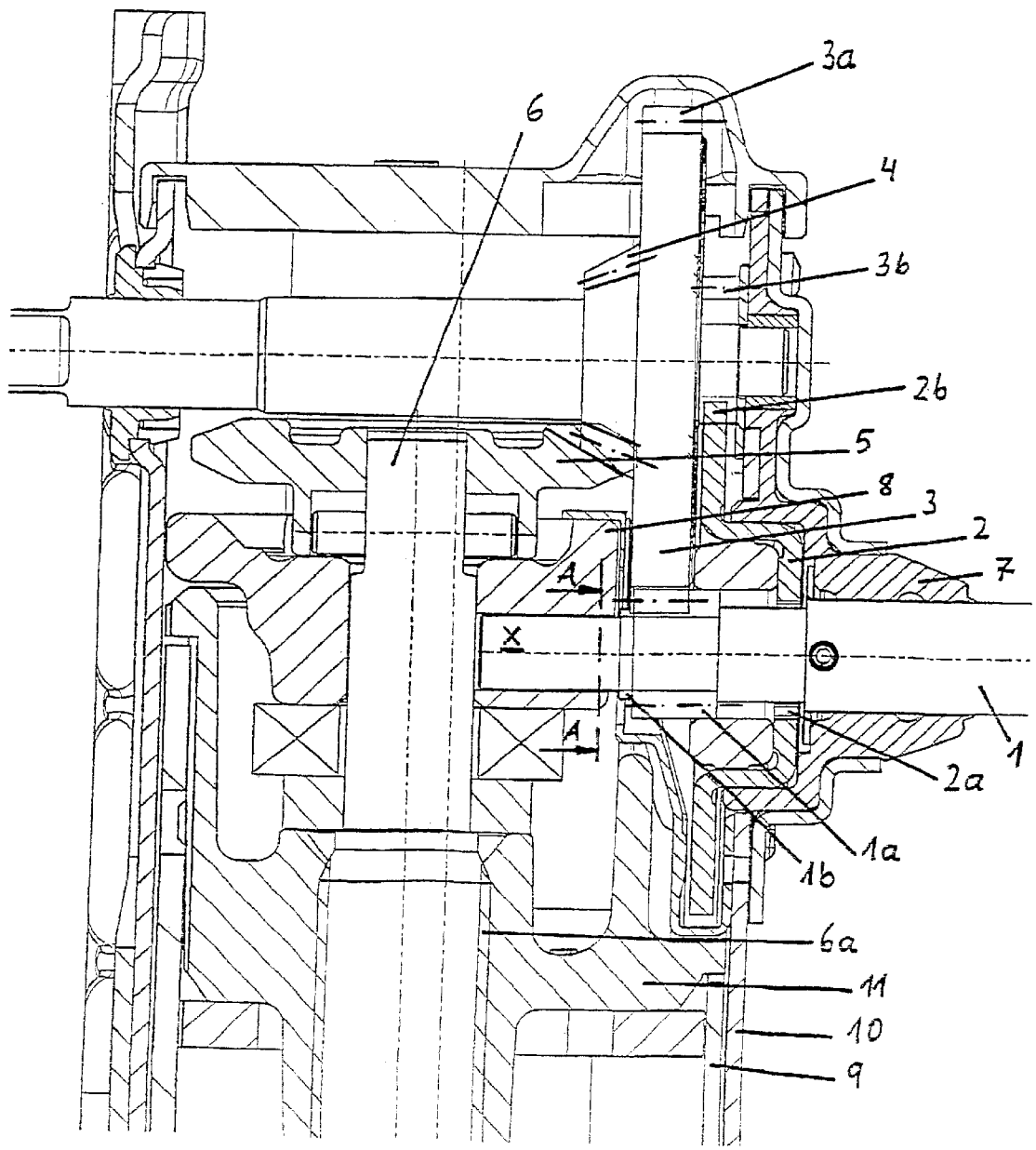
FIG. 1 is a vertical section of the support device in the low gear position.

FIG. 1 shows a vertical section of the support device in the area of the gear in the low gear position. The crank drive 1, which is axially displaceably supported in a bearing holder 7 that is mounted on housing 12 and on a bearing plate 8, is positioned in such a way that the crank drive with its spindle-side end X is received in bearing plate 8 in a maximum insertion position and the gear teeth of crank drive 1*a* engage with the external gear teeth 3*a* of drive shaft 3 for the low gear position.

In axial direction, offset to the external gear teeth 3*a,* a bevel gear 4 is also non-rotatably arranged on drive shaft 3 and in turn engages with the complementary gear teeth of bevel gear 5. Bevel gear 5 transmits the torque to spindle 6. Spindle 6 is provided with a thread 6*a* on which a spindle nut 11 runs. The spindle itself is supported in bearing plate 8, which is fixedly connected with shaft tube 10. The spindle nut 11 is connected with the tube of the internal leg 9. The rotary movement of spindle 6 causes an axial movement of spindle nut 11 and thus an axial relative movement between shaft tube 10 and the tube of the inner leg 9. The tubes are telescoped relative to one another.

When the support device is operated in low gear, the forces and moments are introduced via the crank drive 1, transmitted from there via drive shaft 3 and bevel gear 4 of drive shaft 3 to bevel gear 5 and move inner tube 9 via spindle 6 and spindle nut 11.

Figure 2:
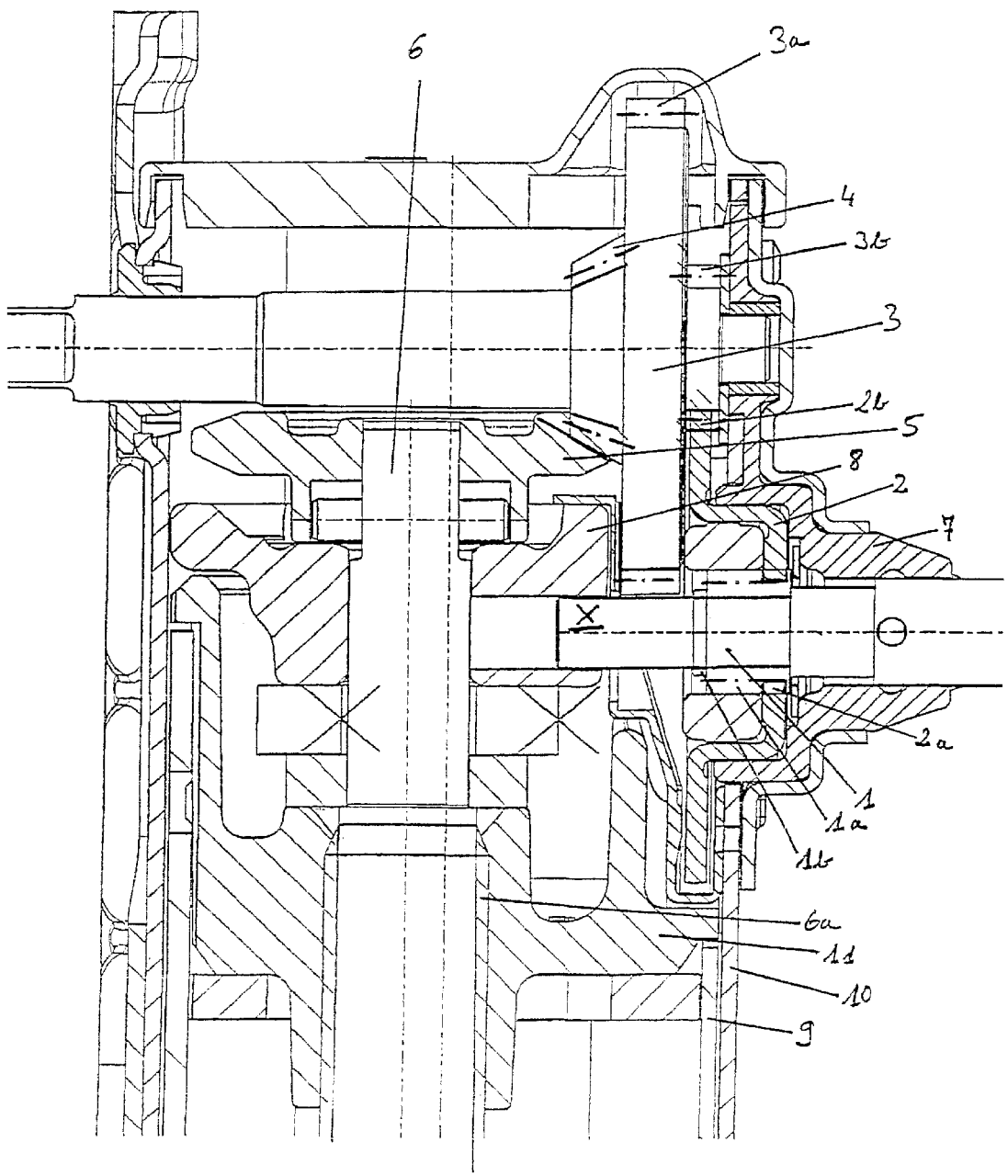
FIG. 2 is a vertical section of the support device in the overdrive gear position.

FIG. 2 shows a cross section of the support device in overdrive position. Crank drive 1 is displaced axially outwardly and is supported in bearing plate 8 with only a portion of its spindle-side end X of crank drive 1. In this position, the gear teeth 1*a* of crank drive 1 interact with the internal gear teeth 2*a* of gear 2. Gear 2 also has gear teeth along its outside diameter. These external gear teeth 2*b* are in constant engagement with additional gear teeth 3*b* of drive shaft 3, which is also non-rotatably connected with bevel gear 4.

In overdrive, the forces and moments are transmitted from crank drive 1 via overdrive gear 2, external gear teeth 3*b* of drive shaft 3 and bevel gear 4 of drive shaft 3 to bevel gear 5. Bevel gear 5 ensures rotation of spindle 6 and displacement of spindle nut 11 and of inner leg tube 9, which is attached thereto.

Figure 3:
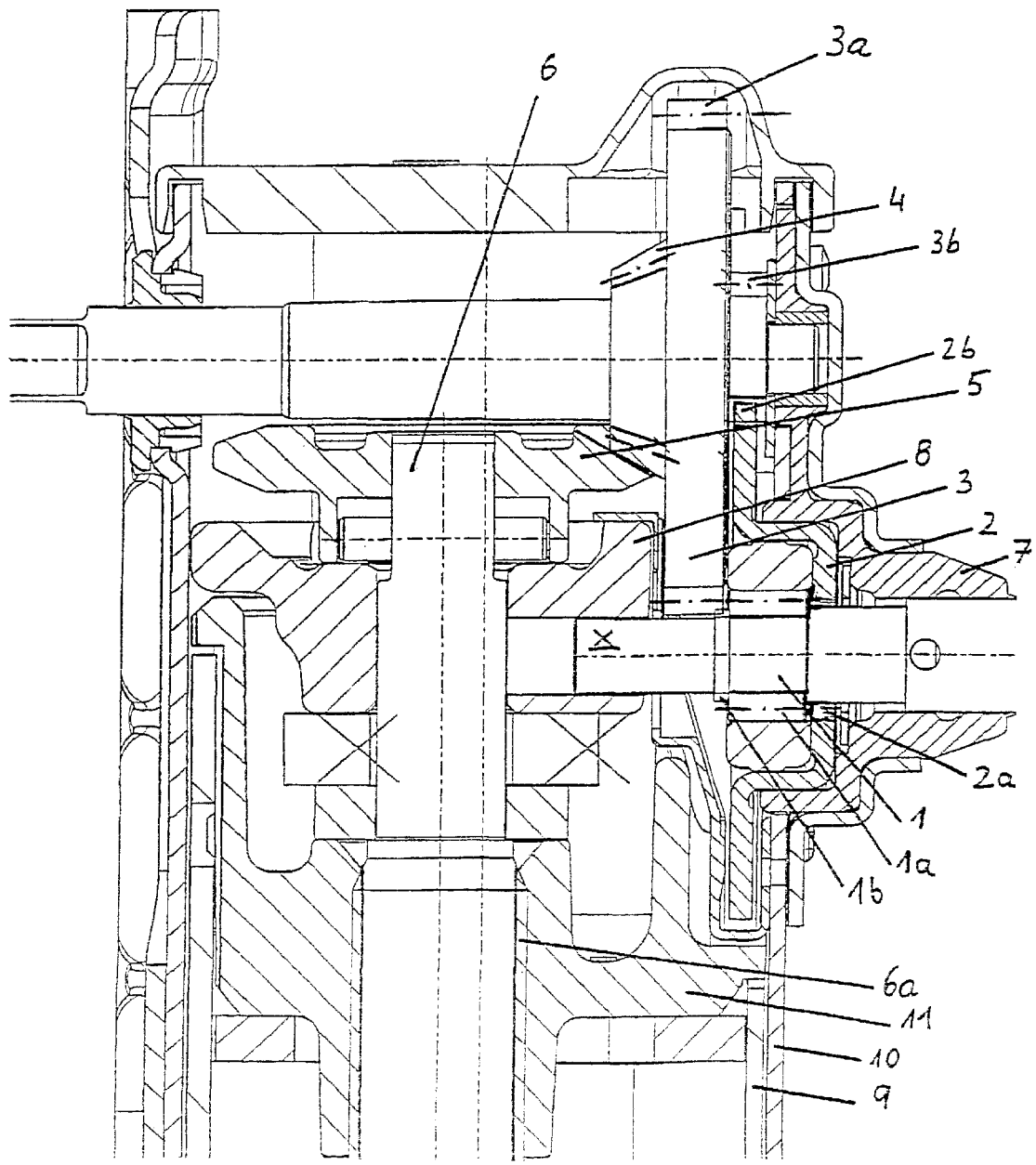
FIG. 3 is a vertical section of the support device in the neutral position.

FIG. 3 shows a cross section of the support device in neutral position. In this position, crank drive 1 is axially displaced such that gear teeth 1*a* of crank drive 1 are axially between the external gear teeth 3*a* of drive shaft 3 for the low gear position and the internal gear teeth 2*a* of the overdrive position. When crank drive 1 rotates, no torque is transmitted from gear teeth 1*a* of the crank drive to external gear teeth 3*a* of drive shaft 3 for the low gear position or internal gear teeth 2*a* of the overdrive gear.

Figure 4:
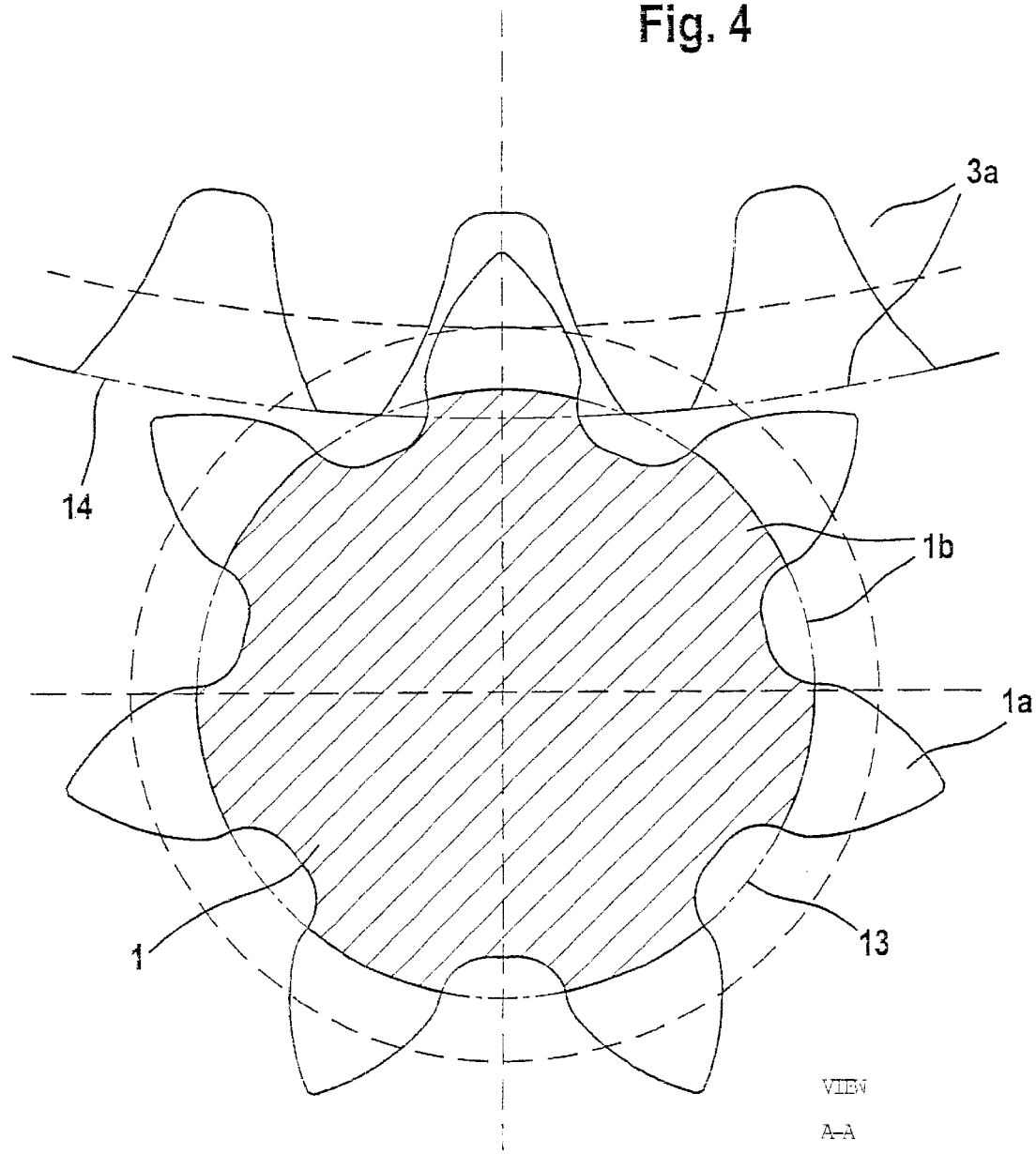
FIG. 4 is a side view of the external gear teeth of the drive shaft for the load position and the gear teeth of the crank drive taken along plane A—A in accordance with FIG. 1.

In the direction of spindle-side end X of crank drive 1, the gear teeth 1*a* of crank drive 1 are configured as reduced gear teeth 1*b* of crank drive 1. To this end, the tip circle of the original gear teeth 1*a* of crank drive 1 is reduced to the reduced gear teeth 1*b* of crank drive 1 as depicted in FIG. 4. The reduced gear teeth 1*b* with tip circle 13 of crank drive 1 allow the crank drive to rotate without reduced gear teeth 1*b* contacting the stationary gear teeth 3*a* of drive shaft 3 (see FIG. 4). The tip circle 13 protrudes into the gap between two teeth of external gear teeth 3*a* without touching them.

In the opposite flow of force, starting from tube 9 of the inner leg via bearing plate 8 and spindle 6 as well as bevel gear 4, 5 to outer gear teeth 3*a* which are non-rotatably mounted on the drive shaft, the outer gear teeth 3*a* of drive shaft 3 are blocked by the reduced gear teeth 1*b* of crank drive 1 while the crank drive is stationary, e.g. while the crank drive is secured. This is prevented [sic] due to the fact that the tips of gear teeth 3*a* would have to move along their tip circle 14 in a rotary movement, which would cause them to overlap with gear teeth 1*b* of crank drive 1. As a result, when the crank is secured, or even through the unsecured crank's own weight, spindle 6 is also prevented from rotating in neutral position and the support jack is thus secured against descending of tube 9 of the interior leg.

| Reference Numerals: | |
|---|---|
| 1 | crank drive |
| 1a | gear teeth of crank drive |
| 1b | reduced gear teeth of crank drive |
| 2 | overdrive gear |
| 2a | interior gear teeth of overdrive gear |
| 2b | external gear teeth of overdrive gear |
| 3 | drive shaft |
| 3a | external gear teeth of drive shaft for low gear position |
| 3b | external gear teeth of drive shaft for overdrive position |
| 4 | bevel gear teeth of drive shaft |
| 5 | bevel gear |
| 6 | spindle |
| 6a | thread of spindle |
| 7 | bearing holder |
| 8 | bearing plate |
| 9 | tube of inner leg |
| 10 | tube of shaft (outer tube) |
| 11 | spindle nut |
| 12 | housing |
| 13 | tip circle |
| 14 | tip circle |
| X | spindle-side end of crank drive |

What is claimed is:

1. A device for supporting a trailer of a semitrailer truck, said device comprising:

a vertical spindle drive for adjusting the height of the support device, a horizontal, particularly a crank-handle-driven input shaft and an angle drive for redirecting the torque of the input shaft to the spindle drive, wherein the angle drive comprises at least two gears that are spaced at a distance from one another for gear positions of different gear ratios, which can be optionally brought into engagement with a ring gear of the input shaft by horizontally displacing the input shaft, wherein the ring gear of the input shaft has two axial longitudinal sections of different diameters with identical tooth pitch throughout, wherein a section of a normal diameter with full tooth formation, the axial length of which is less than the distance between two gears, to define a neutral position for the input shaft, and an extension section with a radially reduced tooth length, which protrudes into a gear in neutral position of the input shaft, wherein the reduction in the tooth length of the extension section is dimensioned such that the input shaft is rotatable in neutral position when the gear is stationary, but the gear is prevented from rotating when the input shaft is stationary because the teeth with reduced length engage.

2. A device as claimed in claim 1, wherein the angle drive has exactly two gears spaced at a distance from one another for gear positions of different gear ratios.

* * * * *